US012747931B2

(12) United States Patent
Rye

(10) Patent No.: US 12,747,931 B2
(45) Date of Patent: Sep. 29, 2026

(54) DRAW ALERT SYSTEM FOR A WEAPON HOLSTER

(71) Applicant: Nicole Danielle Rye, Cave Creek, AZ (US)

(72) Inventor: Nicole Danielle Rye, Cave Creek, AZ (US)

( * ) Notice: Subject to any disclaimer, the term of this patent is extended or adjusted under 35 U.S.C. 154(b) by 306 days.

(21) Appl. No.: 18/501,848

(22) Filed: Nov. 3, 2023

(65) Prior Publication Data

US 2024/0068772 A1 Feb. 29, 2024

Related U.S. Application Data

(63) Continuation of application No. PCT/US2022/027715, filed on May 4, 2022.

(60) Provisional application No. 63/184,750, filed on May 5, 2021.

(51) Int. Cl.
*F41C 33/02* (2006.01)
*G08B 21/18* (2006.01)

(52) U.S. Cl.
CPC ........ *F41C 33/029* (2013.01); *F41C 33/0209* (2013.01); *G08B 21/18* (2013.01)

(58) Field of Classification Search
CPC ..... F41C 33/029; F41C 33/0209; G08B 21/18
See application file for complete search history.

(56) References Cited

U.S. PATENT DOCUMENTS 3,530,451 A 9/1970 Devine
5,108,019 A 4/1992 Woodward et al.
5,611,164 A 3/1997 Rassias
9,816,779 B2 11/2017 Moon
10,775,132 B2 9/2020 Tedder et al.
11,543,202 B1 * 1/2023 Williams ................ F41A 17/06
12,018,912 B2 * 6/2024 Cosico .................... F41C 33/06
12,188,745 B1 * 1/2025 Salazar ................. F41C 33/029
2001/0019071 A1 9/2001 Vor Keller et al.
2001/0033228 A1 10/2001 Kisreman et al.
2006/0042142 A1 3/2006 Sinha
2006/0208857 A1 9/2006 Wong
2015/0254968 A1 * 9/2015 Sanders ................ F41C 33/029 340/539.13

(Continued)

OTHER PUBLICATIONS

PCT International Preliminary Report on Patentability (Chapter I of the Patent Cooperation Treaty) for PCT/US2022/027715, Applicant: Rye, Nicole Danielle, Form PCT/IB/326 and 373, dated Nov. 16, 2023 (15 pages).

(Continued)

*Primary Examiner* — Derek J Battisti

(74) *Attorney, Agent, or Firm* — VISTA IP LAW GROUP LLP

(57) ABSTRACT

A "false draw" and/or "shots fired" alert system for use with a weapon holster. The system generates one or more signals when a weapon is drawn from the holster and/or when shots are fired. The signal(s) may include an audible signal and/or a wireless signal. The audible signal identifies the type of weapon drawn (e.g., a handgun, TASER, stun gun) and may include other sounds such as oral commands. The wireless signal may be a text, email, alert, or other notification to one or more remote devices indicating the specific type of weapon has been drawn and/or fired, and may include other information such as GPS location and owner of the holster.

22 Claims, 2 Drawing Sheets

(56) References Cited

U.S. PATENT DOCUMENTS

| | | | | |
|---|---|---|---|---|
| 2015/0332604 | A1 | 11/2015 | Rich | |
| 2016/0377373 | A1* | 12/2016 | Feldstein | F41C 33/029 42/1.01 |
| 2018/0100713 | A1* | 4/2018 | Patches | G08B 25/004 |
| 2019/0137215 | A1* | 5/2019 | Bernkrant | F41C 33/0263 |
| 2020/0217613 | A1 | 7/2020 | Hatcher et al. | |

OTHER PUBLICATIONS

PCT International Search Report for PCT/US2022/027715, Applicant: Rye, Nicole Danielle, Form PCT/ISA/210 and 220, dated Aug. 2, 2022 (5 pages).

PCT Written Opinion of the International Search Authority for PCT/US2022/027715, Applicant: Rye, Nicole Danielle, Form PCT/ISA/237, dated Aug. 2, 2022 (13 pages).

"Unintended: A theory of TASER/weapon confusion" (Police1 by Lexipol), Apr. 15, 2021 (Apr. 15, 2021) [online] (retrieved from the internet on Jul. 11, 2022) <URLhttps://www.police1.com/use-of-force/articles/unintended-a-theory-of-taserweapon-confusion-QbzSulHylcmjrOfM/>, entire document, especially p. 6, "Police1 Readers Respond", paragraph2.

* cited by examiner

DRAW ALERT SYSTEM FOR A WEAPON HOLSTER

RELATED APPLICATIONS DATA

This Application is a continuation of International Patent Application No. PCT/US2022/027715, filed on May 4, 2022, which claims priority to and the benefit of U.S. provisional application Ser. No. 63/184,750, filed on May 5, 2021, the disclosures of all of which are hereby incorporated herein by reference in their entirety into the present application.

TERMINOLOGY

A "weapon" as used herein means any weapon carried in a holster, such as a handgun (pistol or revolver), TASER, or stun gun.

As used herein, audible words in quotes such as "gun gun gun!" means those words in English or any other language, and the punctuation (e.g., an exclamation point) is used to emphasize the tone or volume of the signal similar to the spoken language.

INCORPORATION BY REFERENCE

U.S. Pat. No. 10,775,132 issued Sep. 15, 2020 to Tedder et al. titled "Wireless Holster" ("the '132 patent"), and U.S. Patent Publication No. 20190137215 published May 9, 2019 to Bernkrant et al. titled "Smart Weapon Holster" ("the '215 Publication"), are both hereby fully incorporated herein by reference.

FIELD OF THE INVENTION

The invention relates generally to weapon holsters, and more specifically to alert systems for use with weapon holsters.

BACKGROUND

Handguns and TASERs (and sometimes stun guns) are often carried in holsters, by law enforcement officers (LEDs), military personnel, and civilians alike (collectively referred to herein as "shooters"). Although some generic holsters exist, typically holsters are designed for specific makes and/or models of weapons to meet safety, comfort, and functional requirements, including for example a desirable level of retention. Responsible shooters therefore rarely place a weapon in an incorrect holster, i.e., a holster not designed to accommodate the weapon. Additionally, a TASER typically cannot fit into a handgun holster due to the TASER's relatively larger and unique profile. Likewise, a handgun typically cannot fit correctly into a TASER holster due to the handgun's relatively smaller and unique profile.

Nonetheless, when a shooter draws their weapon from a holster in a real-time encounter, the situation is often accompanied by a sudden increase in stress levels and a rise in adrenaline. As such, mistakes may occur such as grabbing a handgun instead of a TASER, or vice versa (a "false draw"). Also when a shooter (especially an LEO) draws their weapon in a real-time situation, often others are unaware, including other LEOs present, civilian bystanders, remote LEO command, and even a criminal suspect on whom the weapon is drawn. Such false draws and/or lack of awareness regarding a drawn weapon can result in undesired consequences.

Another situation that arises with LEOs is when shots are fired from a weapon (i.e., rounds from a firearm, wires from a TASER, or activation of a stun gun), the LEO relays that information to command usually by radio. But sometimes the LEO is unable to do so either because of injury, equipment malfunction, or some other reason.

Some holsters incorporating technology have been described in the '132 patent, and the '215 Publication. But neither of them describes alerting the shooter to a false draw, or detecting and reporting "shots fired" in real-time. Therefore, there is a need for a holster system that alerts the shooter to a false draw, and/or detects and reports when shots are fired or a weapon is deployed in real-time.

SUMMARY OF THE INVENTION

The invention is a weapon holster with an alert system. The alert system may include a microcontroller, a power supply, a speaker, a memory, a transceiver, a GPS receiver, a SIM card, a draw detector, a holster camera (holster-cam) with audio/visual capabilities, and/or a shot detector. Any or all such components may be in electronic communication with each other either directly or through the microcontroller or other components.

In an embodiment of the invention, when a weapon is drawn from the holster, the alert system alerts the shooter and/or others as to what type of weapon is drawn, for example a firearm or a TASER. The alert system may also activate the holster-cam (150) upon detection of a weapon drawn and/or shots fired. A local alert may include an audible alert through the speaker such as "gun gun gun!" when a firearm is drawn, or "TASER TASER TASER!" when a TASER is drawn. The alert system may also send a signal corresponding to the weapon being drawn, through WiFi, BLUETOOTH, cellular or other wireless protocol to one or more remote devices such as a smart phone, a terminal at an LEO command center, etc.

In an embodiment of the invention, when a weapon is fired, the alert system alerts the shooter and/or others. A local alert may include an audible alert through the speaker such as "shots fired!" when a firearm is fired, or "TASER fired!" when a TASER is deployed. The alert system may also send a wireless signal corresponding to shots being fired, to one or more remote devices.

DRAWINGS

DETAILED DESCRIPTION

Embodiments of the invention will now be described. The invention relates to an alert system (100) for use with a weapon holster (105). The holster (105) may be any weapon holster. The alert system is designed to alert the shooter and/or others (locally and/or remotely) what type of weapon is drawn from the holster (5), and/or when shots are fired from the weapon.

Figure 1:
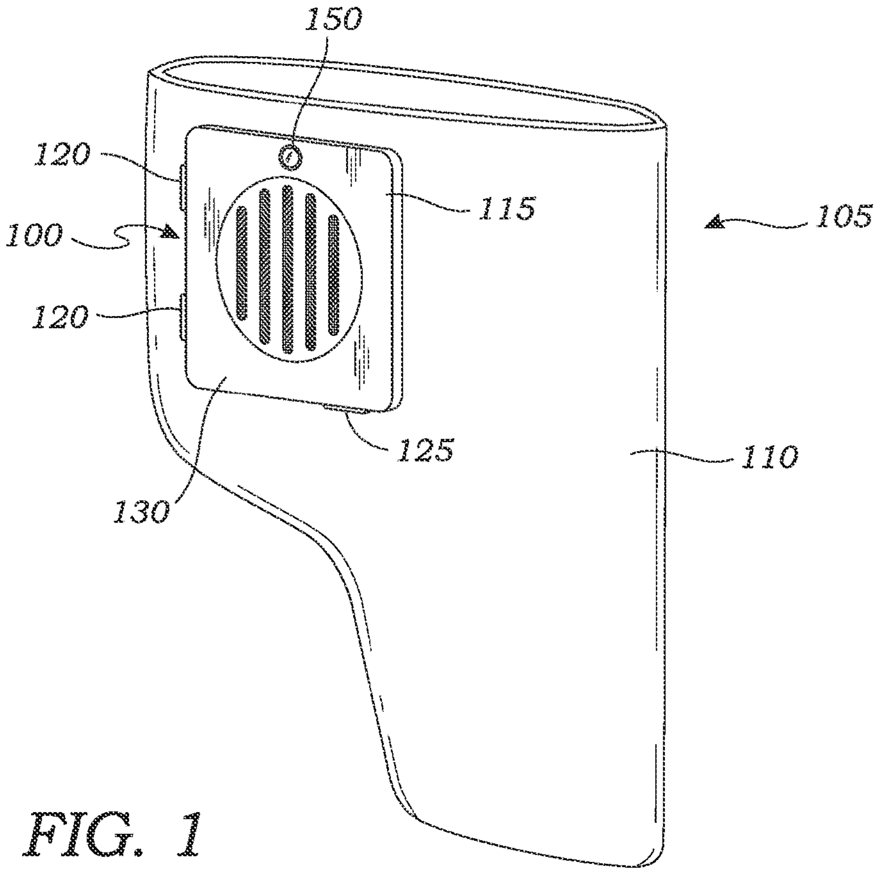
FIG. 1 shows a holster with an alert system of the present invention incorporated therein.
Figure 2:
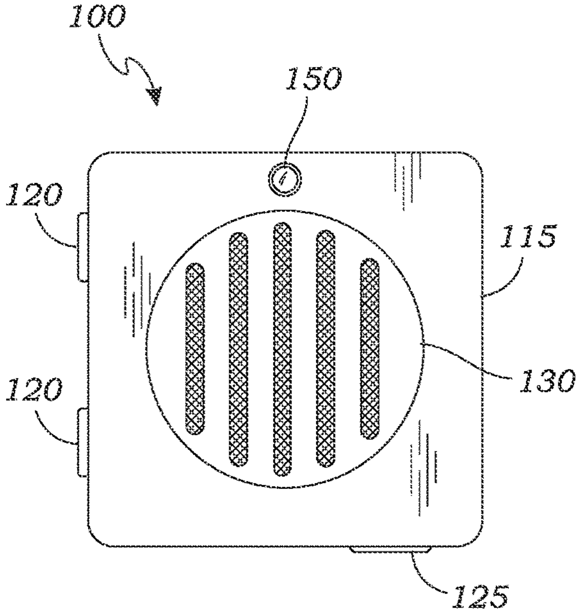
FIG. 2 shows a front view of the alert system shown in FIG. 1.
Figure 3:
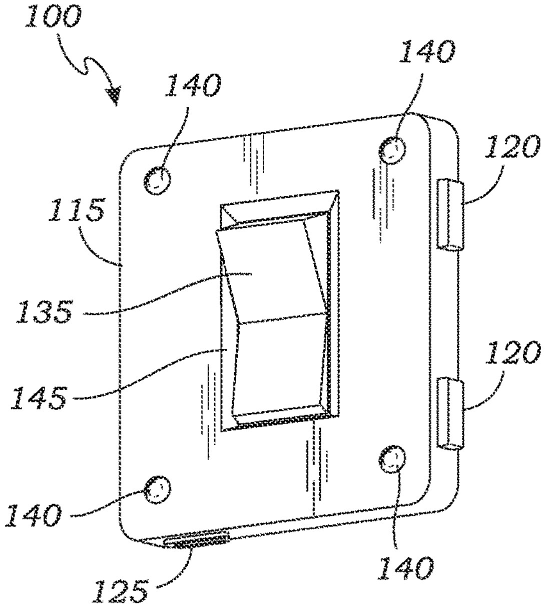
FIG. 3 shows a back perspective view of the alert system shown in FIG. 1.

Turning to FIGS. 1-3, the alert system (100) may be integrated into the holster (105), such as being molded into the holster body (110) during manufacture or assembly as shown in FIG. 1, stitched in (for leather holsters), press-fitted in, etc. In these situations, the alert system (100) will have a profile configured for use with the specific holster (105), which would vary depending on the make and model of weapon for which the holster (105) was designed. Alternatively, the alert system (100) may be removably attachable to the holster (105) or in close proximity thereto, e.g. affixed to a drop-down attachment or to a pistol belt, such as with retrofit applications. Such attachment may be by clips, VELCRO, belt loops, MOLLE straps, or any other suitable means, and would vary depending on the profile of the holster (105). The alert system (100) may be positioned anywhere on the holster (105) or in close proximity thereto, and may have panels or openings to allow repair, maintenance, and change of batteries as applicable. The alert system (105) includes various electrical and/or electro-mechanical components, which may be secured in a housing/casing (115). The casing (115) should be water-resistant and impact-resistant. The components may include a micro-controller, a power supply, a speaker, a memory, a SIM card, a transceiver, a GPS receiver, a draw detector, a shot detector, various function switches (120) (e.g., "covert" or "overt" mode, shot detector "on" or "off"), and/or various ports (125) such as USB ports, a power supply port, a recharging port, etc. Many of such components are shown and described in detail in the '132 Patent and the '215 Publication, and their use and arrangement are all well-known in the art. The housing (115) may include a speaker grill/cover (130).

A purpose of the invention is to alert the shooter to a false draw. This is done by the alert system (100) outputting an audio signal indicative of the type of weapon being drawn. For example, the alert system (100) for a firearm holster may be programmed or preset with a firearm audio signal such as "gun!" (repeated any number of times) or other sound associated with a firearm (e.g., "gun, get down!" or "gun freeze!"), such that when the firearm is drawn, the firearm audio signal is output via the speaker. In this manner, the fact that the shooter drew out a firearm (as opposed to a TASER or other weapon) is reinforced in the shooter's mind. Likewise, the alert system (100) for a TASER holster may be preprogrammed or preset with a TASER audio signal such as "TASER!" (repeated any number of times) or other sound generally associated with a TASER, such that when the TASER is drawn, the TASER audio signal is output via the speaker. In this manner, the fact that the shooter drew out a TASER (as opposed to a firearm or other weapon) is reinforced in the shooter's mind.

Another purpose of the invention is to alert others locally and/or remotely when a weapon is drawn and/or fired. This may be accomplished with the transceiver. The information may include GPS location of the holster (105), a holster ID, number of shots fired, time of the event, etc. This information may be useful to other LEOs present at the scene, and remote LEO command centers.

An embodiment of the draw detector is a switch (135) configured to move from a first position to a second position upon the weapon being drawn from the holster, the first position corresponding to a logic circuit being inactive, and the second position corresponding to the logic circuit being active/triggered. The switch (135) may be a rocker switch or any other switch, positioned such that when the weapon is holstered, the weapon causes, forces, or allows the switch (135) to move to the first position such that a corresponding logic circuit is inactive, and when the weapon is drawn, the weapon causes, forces, or allows the switch to move to the second position such that the logic circuit is triggered. Such actions may rely on friction, positive and/or negative biased spring forces, engagement or disengagement of latches, buttons, detents (140), clips, snaps, and/or other means. As seen in FIG. 3, the switch (135) may be positioned in a countersink (145) in the housing (115) of the alert system (100), to minimize the overall profile of the alert system (100). FIG. 3 also shows four detents (140) for illustrative purposes. The exact location and quantity of detents (140), if any, will depend on the profiles of the weapon and alert system (100).

The draw detector may also use magnets to detect the draw. For example, if the draw detector is placed at the bottom of the holster (105), a change in magnetic field between the weapon muzzle and a magnet in the alert system (100) may be detected when the weapon is drawn. The draw detector may also use an electrical sensor (motion, proximity, laser, etc.) to detect the draw (e.g. if the draw detector is placed in close proximity to the holster (105) so that the sensor is activated when the weapon is drawn). Other embodiments of the draw detector may be implemented and may be tied to disengagement of a retention system instead of or in addition to an actual draw.

The shot detector may include a microphone and technology similar to a shot timer to detect a shot has been fired. When a shot is detected, the microcontroller/logic circuit triggers corresponding actions, such as emitting a shot detection audio signal through the speaker and/or sending a wireless signal to one or more remote devices.

Other components include function switches (120) to control various functions. For example, one function switch may activate or deactivate the holster-cam (150). One function switch may toggle the alert system (100) between a "covert" mode in which the audible signals are minimized or eliminated, and an "overt" mode wherein the audio signals are output at maximum amplitude. "Covert" mode may be desirable, for example, if an LEO team is serving a warrant with weapons drawn at the ready but does not want to alert a suspect of their presence. The "covert" mode may still nonetheless send signals to remote devices. Another option in this example is a dial instead of a switch (120), to allow for analog adjustment of volume.

Another aspect of the invention allows features and settings of the alert system (100) to be programmed and/or controlled via a remote device such as by using an app on a smart phone, or through a PC or other device connected to the alert system (100) via any suitable means (e.g., Bluetooth, WiFi, cellular) through a network including the Internet. Such features and settings may include setting the mode to "covert" or "overt," activating or deactivating the shot detector and/or draw detector, activating or deactivating a holster-cam (150), and/or changing an audio signal to one of a plurality of preset signals and/or a custom signals (e.g., from one language to another, or to include additional signals such as "Police!") or allowing creation of a custom audio signal.

Additional embodiments of the invention include use of the alert system (100) with other weapons, such as long guns, bean bag shotguns, weapons configured to fire rubber bullets, OC or pepper spray, mace, or even a baton. In these embodiments, the audio signal may be preset to correspond to the weapon type in a similar manner as described herein, so the weapon type drawn is reinforced in the shooter's mind.

An additional embodiment includes a remote locking feature. This feature allows the shooter (or someone else with authorized access) to lock a retention system on the holster (105) to further secure the weapon in the holster (105). This may be desirable, e.g., after an officer-involved shooting, or if the weapon and holster (105) are lost or stolen or otherwise unsecured. Locking may be achieved through remote commands using a smart phone app or other device in wireless communication with the alert system (100).

Figure 4:
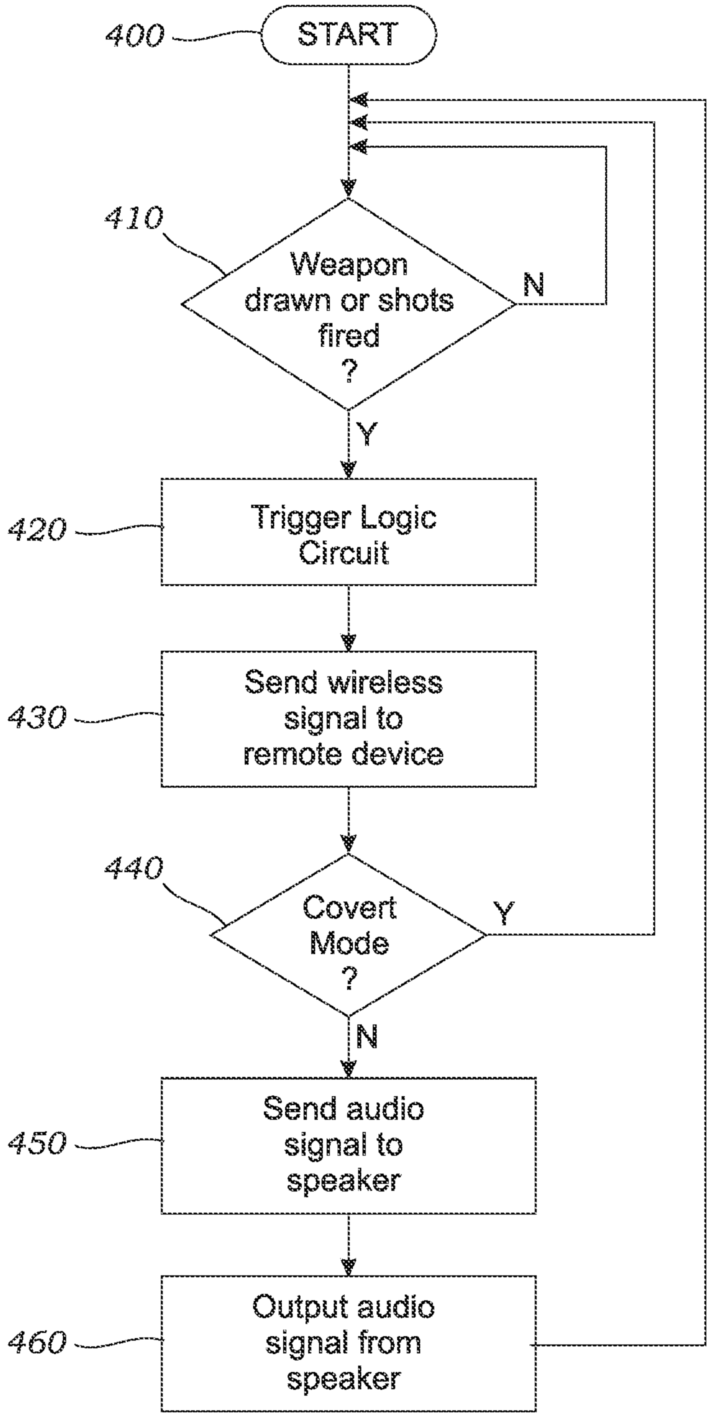
FIG. 4 shows a flowchart illustrating a method of the present invention.

Turning to FIG. 4, a flowchart of a method of the present invention is shown. This method presumes the alert system (100) is active, i.e., powered on. As such, the alert system (100) is constantly monitoring for weapons being drawn and/or shots fired as applicable. The method will end when the alert system (100) is powered off.

The method begins at Step 400. At Step 410, if the draw detector and/or the shot detector detect that the weapon has been drawn and/or that a shot has been fired respectively, the method proceeds to Step 420, otherwise the method loops back to Step 410 to continuously check for a weapon draw or shots fired. If a draw or shot is detected, corresponding logic circuits are triggered in the alert system (100), as shown at Step 420. Such circuits may be programmed to activate a holster-cam (150), trigger a call from a local Bluetooth-enabled smartphone, etc. Typically, the circuits will be programmed to send one or more corresponding wireless signals to one or more remote devices, as seen at Step 430. If the alert system (100) is in "covert" mode as then determined at Step 440, the method loops back to Step 410. If, however, the alert system (100) is in "overt" mode as determined at Step 440, the circuits are typically programmed to send a corresponding audio signal to the speaker as seen at Step 450, and the signal is then output from the speaker at Step 460 before the method loops back to Step 410.

The steps do not need to be performed in the order shown. For example, Step 430 may occur in parallel with Steps 440-460. Similarly, not all steps must be performed. For example, Step 430 may be omitted altogether.

An alert system (100) for use with a weapon holster (105) has thus been described, along with methods of use.

What is claimed is:

1. A holster for a weapon comprising:

a body configured to receive a type of weapon selected from the group consisting of a firearm and a TASER; and an alert system comprising a microcontroller, a power supply, a speaker, and a draw detector;

wherein the draw detector is configured to detect when a weapon is drawn from the holster and to trigger a logic circuit in the microcontroller in response thereto;

wherein the logic circuit is programmed to send an audio signal to the speaker corresponding to the type of weapon.

2. The holster of claim 1, wherein the draw detector comprises a mechanical switch configured to move from a first position to a second position upon the weapon being drawn from the holster, the first position corresponding to the logic circuit being inactive and the second position corresponding to the logic circuit being triggered.

3. The holster of claim 1, wherein the draw detector is configured to detect when the weapon is drawn from the holster based on a change in a magnetic field.

4. The holster of claim 1, further comprising a holster-cam electronically connected to the logic circuit, and wherein the logic circuit is programmed to activate the holster-cam.

5. The holster of claim 1, wherein the type of weapon is a firearm and the audio signal is a firearm audio signal.

6. The holster of claim 1, wherein the alert system further comprises a shot detector, and the microcontroller is configured to send a shot detection audio signal to the speaker in response to the shot detector detecting a shot fired from the weapon.

7. The holster of claim 6, wherein the shot detection audio signal comprises "shots fired!".

8. The holster of claim 6, wherein the alert system further comprises a transceiver, and wherein the microcontroller is configured to send a wireless signal via the transceiver to a remote device in response to the shot detector detecting a shot fired from the weapon.

9. The holster of claim 1, wherein the alert system further comprises a transceiver, and wherein the microcontroller is configured to send a wireless signal via the transceiver to a remote device in response to the draw detector detecting the weapon has been drawn.

10. A method of providing an alert upon a weapon being drawn from the holster of claim 1, the method comprising;

detecting, by the draw detector, that a weapon is drawn from the holster;

triggering a logic circuit in the microcontroller in response to the detection of the weapon being drawn, the logic circuit being programmed to send an audio signal to the speaker corresponding to the type of weapon; and outputting the audio signal from the speaker.

11. The method of claim 10, wherein the type of weapon is a firearm and the audio signal output is a firearm audio signal.

12. The method of claim 10, wherein the alert system further comprises a shot detector, and the logic circuit is configured to send a shot detection audio signal to the speaker in response to the shot detector detecting a shot fired from the weapon, the method further comprising:

detecting, by the shot detector, that a shot is fired from the weapon; and outputting the shot detection audio signal from the speaker.

13. The method of claim 12, wherein the shot detection audio signal comprises "shots fired!".

14. The method of claim 12, wherein the alert system further comprises a transceiver, the method further comprising the alert system sending a wireless signal via the transceiver to a remote device in response to the shot detector detecting the shot fired from the weapon.

15. The method of claim 10, wherein the alert system further comprises a transceiver, the method further comprising the alert system sending a wireless signal via the transceiver to a remote device in response to the draw detector detecting the weapon is drawn.

16. An alert system for use with a holster comprising:

a microcontroller;

a power supply;

a speaker; and a draw detector;

wherein the draw detector is configured to transition from a first state to a second state upon detecting that a weapon is drawn from the holster, the first state corresponding to a logic circuit in the microcontroller being inactive, and the second state corresponding to the logic circuit being triggered; and wherein the logic circuit is programmed to send an audio signal to the speaker corresponding to the type of weapon.

17. The alert system of claim 16, wherein the draw detector is a switch, and the switch transitions from the first state to the second state by mechanical actuation when the weapon is drawn.

18. The alert system of claim 16, further comprising a transceiver, and wherein the logic circuit is programmed to send a wireless signal to a remote device using the transceiver.

19. The alert system of claim 16, further comprising a shot detector;

wherein the shot detector is configured to trigger a second logic circuit in the microcontroller upon detecting a shot fired; and wherein the second logic circuit is programmed to send a shot detection audio signal to the speaker.

20. The alert system of claim 19, wherein the second logic circuit is programmed to send a wireless signal to a remote device via the transceiver.

21. The alert system of claim 19, further comprising a holster-cam, and wherein the second logic circuit is programmed to activate the holster-cam.

22. The alert system of claim 16, further comprising a holster-cam, and wherein the logic circuit is programmed to activate the holster-cam.

* * * * *